(12) United States Patent
Hugunin et al.

(10) Patent No.: US 6,282,831 B1
(45) Date of Patent: *Sep. 4, 2001

(54) QUICK SET FISHING RIG AND FISH HOOK

(76) Inventors: Jim Hugunin, 1113 Galway Rd., Joliet, IL (US) 60431; Jim Plunkett, 6083 Whitebirch Rd., Land O Lakes, WI (US) 54540

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,511

(22) Filed: Jan. 26, 1999

(51) Int. Cl.[7] .................................................. A01K 83/06
(52) U.S. Cl. ............................... 43/45; 43/43.16; 43/44.8; 43/44.82
(58) Field of Search ................. 43/43.16, 44.2, 43/44.8, 44.82, 44.83, 4.5

(56) References Cited

U.S. PATENT DOCUMENTS

| | | | | |
|---|---|---|---|---|
| 699,711 | * | 5/1902 | Pyott | 43/44.82 |
| 2,180,822 | * | 11/1939 | Gruenhagen | 43/44.82 |
| 2,703,947 | * | 3/1955 | Petrasek | 43/44.82 |
| 2,733,539 | * | 2/1956 | Kelly | 43/44.82 |
| 2,800,740 | * | 7/1957 | Glaze | 43/44.82 |
| 2,836,922 | * | 6/1958 | Cox | 43/44.2 |
| 2,871,611 | * | 2/1959 | Shepherd | 43/44.2 |
| 2,977,710 | * | 4/1961 | Stambaugh | 43/44.2 |
| 3,541,719 | * | 11/1970 | Temple | 43/44.8 |
| 4,688,347 | * | 8/1987 | Krogmann | 43/44.8 |
| 4,937,966 | * | 7/1990 | McKenzie | 43/44.2 |
| 4,961,279 | * | 10/1990 | Hanson | 43/43.16 |
| 4,987,696 | * | 1/1991 | Cook | 43/43.16 |
| 5,077,931 | * | 1/1992 | Marshall | 43/44.8 |
| 6,038,806 | * | 3/2000 | Maitland | 43/44.8 |

* cited by examiner

*Primary Examiner*—Kurt Rowan
(74) *Attorney, Agent, or Firm*—Patula & Associates, P.C.

(57) ABSTRACT

A quick set fishing rig and fish hook for live bait is disclosed. The hook includes a main portion, at least one hook portion, and a shank for releasably anchoring the hook into the body of the live bait. The shank extends substantially straight out from the main body portion of the hook and preferably has at least one stabilizing fin provided thereon. The shank is inserted under the skin of the live bait, thus anchoring the hook portions on the live bait. The stabilizing fins of the shank prevent the hook from rotating about the shank axis while in use, and assists the hook to quickly release from the bait when a fisherman or woman sets the hook. The hook is preferably used in connection with a rig providing for the adjustability of the length between a front single hook of the rig and the hook of the present invention.

15 Claims, 3 Drawing Sheets

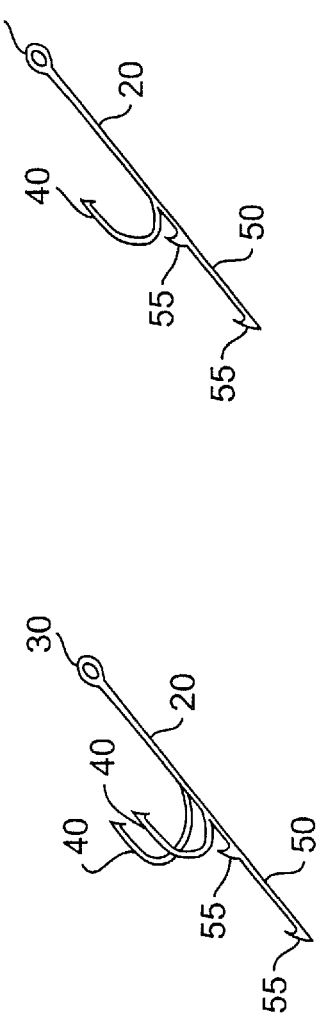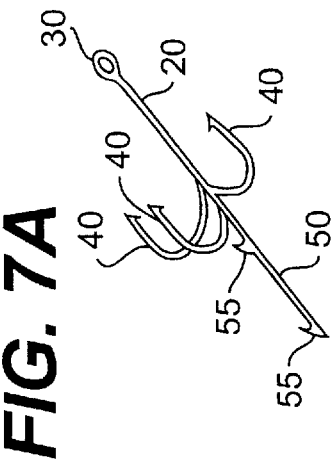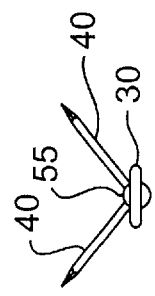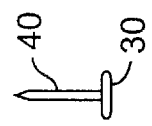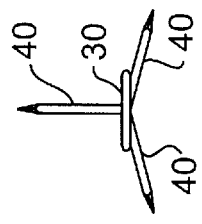

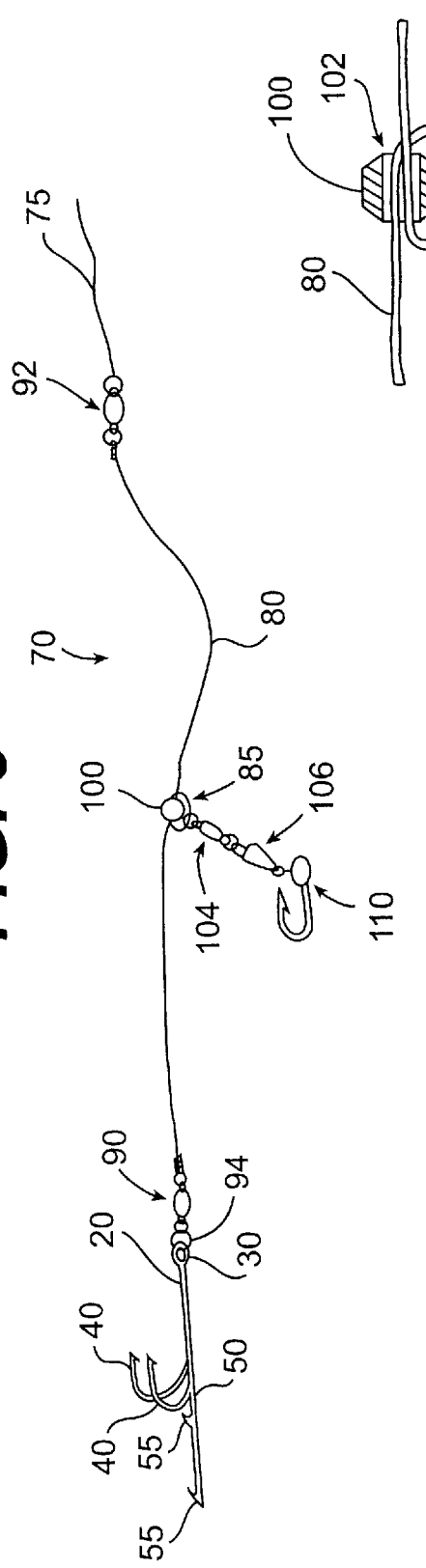
FIG. 8
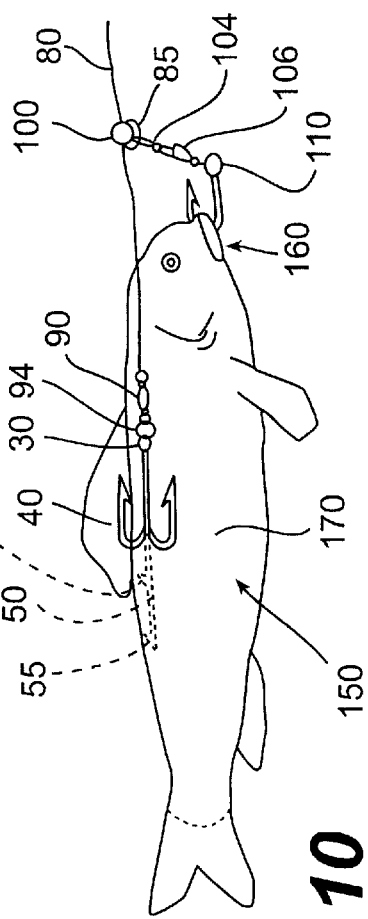
FIG. 9
FIG. 10

QUICK SET FISHING RIG AND FISH HOOK

The present invention relates to hooks for fishing and, particularly, a quick set fishing rig and fish hook for live bait, specifically, a fish hook having an anchoring shank for anchoring the fish hook in the body of the live bait, and a method of rigging the same.

BACKGROUND OF THE INVENTION

Fishing hooks, in general, are "J"-shaped pieces of metal having an eyelet at the top of the "J" for attaching a fishing line, and a barb at the opposite end of the "J." The most common types of fishing hooks are the single hook, and the treble hook. While both types of hooks are found on artificial lures, typically, only a single hook is used for live bait.

However, when fishing with live bait for large game fish such as musky, it is very desirous to attach more than one hook to the live bait. It has been known to attach, in addition to a single hook through the mouth of the live bait, a treble hook approximate the mid-section of the bait. To do so, an additional line segment with a treble hook attached, is run from the single hook, back along the bait to a desired location. One of the barbs of the treble hook is embedded into the bait, leaving the other two barbs exposed to hook a fish.

While such a rig provides the desired additional hooks for live bait, there are disadvantages associated with the same. One major problem with such prior art rigs is encountered when a fisherman or woman attempts to set the hook into the game fish striking the bait. To set a hook, a fisherman must provide a quick strong jerk to the bait, which is intended to cause the exposed hooks to embed into the mouth of the game fish. However, as the fisherman or woman jerks the prior art rig, the barb of the treble hook which is attached to the bait tends to embed deeper into the bait. As a result, the force of the jerk to transferred to the bait, and the exposed barbs of the treble hook all too often do not embed into the game fish. Further, the resultant jerk can pull the bait and the hooks from the mouth of the striking fish. As a result, the game fish is not hooked, and the live bait is injured or killed. Thus a new live bait must be rigged and substantial time, not to mention the game fish, is lost. In general, any hesitation or hinderance in the movement of the hooks when setting the hooks, could result in failing to hook the game fish.

Accordingly, there is a need for a method and device for rigging a live bait with extra hooks, in such a manner that increases the chances for quickly and successfully hooking a striking game fish. The present invention solves the above identified problems associated with prior art rigs and methods of rigging live bait with extra hooks.

BRIEF SUMMARY OF THE INVENTION

The present invention relates to a hook for live bait. The hook of the present invention includes a main portion, at least one hook portion, and a means for anchoring the hook into the body of the live bait. The means for anchoring, as illustrated, takes the form of an anchoring shank extending substantially straight out from the main body portion of the hook. The anchoring shank preferably has at least one stabilizing fin provided thereon.

In use, the anchoring shank is inserted under the skin of the live bait, thus anchoring the hook portions on the live bait. The stabilizing fins of the anchoring shank prevent the hook of the present invention from rotating about the shank axis while in use.

The hook of the present invention is designed in such a manner that when a fisherman or woman goes to set the hook, the present invention pulls free of the live bait. This allows the hook portions to embed into the mouth of the striking game fish without hinderance from the live bait.

The hook of the present invention is preferably used in connection with a novel and unobvious rig, providing for the adjustability of the length between the front single hook and the hook of the present invention. Thus, the novel rig can be quickly adjusted for use on varying sized bait.

Accordingly, it is the principle object of the present invention to provide a method and device for rigging live bait with extra hooks.

It is a further object of the present invention to provide a fishing hook having a means for releasably securing the hook to live bait.

It is another object of the present invention to provide a fishing hook having an anchoring shank.

It is also an object of the invention to provide an adjustable rig for releasably attaching a supplemental hook to live bait.

It is an additional object of the present invention to provide a quick set fishing rig and fish hook.

Numerous other advantages and features of the invention will become readily apparent from the detailed description of the preferred embodiment of the invention, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein:

FIG. 5A is a schematic perspective view of the fishing hook of FIG. 1 having two hooks.

FIG. 5B is a schematic right side view of the fishing hook of FIG. 5A.

FIG. 6A is a schematic perspective view of an alternate embodiment of the fishing hook of FIG. 1 having a single hook.

FIG. 6B is a schematic right side view of the fishing hook of FIG. 6A.

FIG. 7A is a schematic perspective view of an alternate embodiment of the fishing hook of FIG. 1 having three hooks.

FIG. 7B is a schematic right side view of the fishing hook of FIG. 7A.

FIG. 8 is a schematic view of the fishing rig incorporating the fish hook of the present invention.

FIG. 9 is an enlarged cross-sectional view of the adjustable bead of the present invention with leader line therethrough.

FIG. 10 is a schematic view of the fishing rig of FIG. 8 in use on a live bait.

DETAILED DESCRIPTION OF THE PREFERRED EMBODIMENT OF THE PRESENT INVENTION

Figure 1:
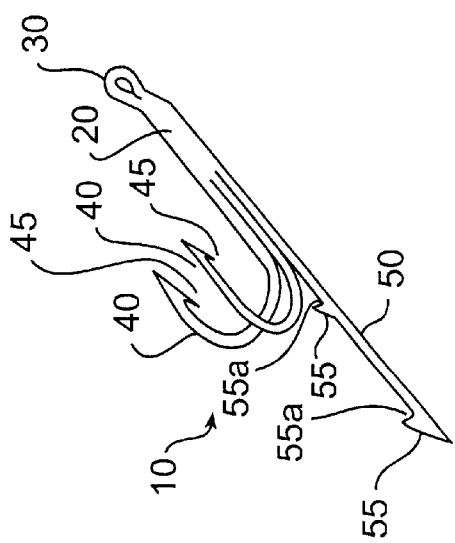
FIG. 1 is a perspective view of the fishing hook of the present invention.

While the invention is susceptible of embodiment in many different forms, there is shown in the drawings and will be described herein in detail a preferred embodiment of the present invention. It should be understood, however, that the present disclosure is to be considered an exemplification of the principles of the invention and is not intended to limit the spirit and scope of the invention and/or claims of the embodiment illustrated.

FIGS. 1 through 4 illustrate the fish hook 10 of the present invention. FIG. 1 is a perspective view of hook 10. Hook 10 is comprised of a main body portion 20, an eyelet 30 at the top or front end of the body portion 20, at least one hook portion 40 (two shown) extending from the body portion 20, and a substantially straight shank 50 extending from the body portion 20.

Figure 2:
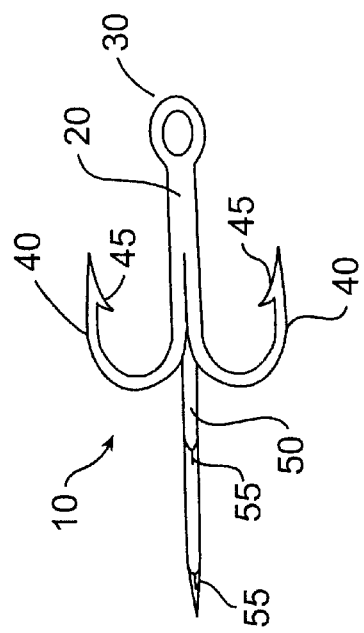
FIG. 2 is a top view of the fishing hook of FIG. 1.
Figure 3:
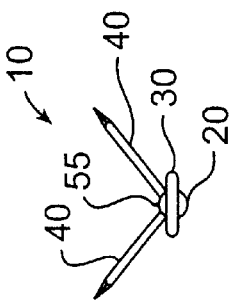
FIG. 3 is a right side view of the fishing hook of FIG. 2.
Figure 4:
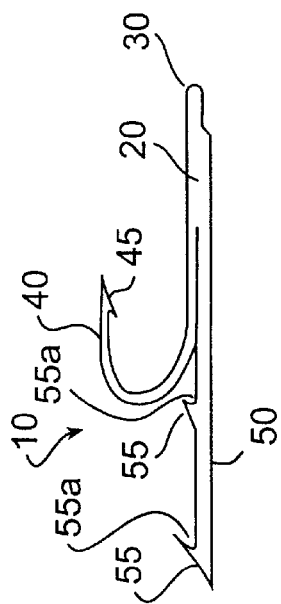
FIG. 4 is a front side view of the fishing hook of FIG. 2.

FIG. 2 is a top view of hook 10. FIG. 3 is a right side view of hook 10, i.e., looking in the direction running from the eyelet 30 towards the shank end of the hook 10. FIG. 4 is a front side view of hook 10. In this view, one of the hook portions 40 is hidden behind the visible hook portion 40.

As can be seen in FIGS. 1, 2 and 4, hook portions 40 and shank 50 meet and integrally form main body portion 20. Hook portions 40 each include a barb 45 at the end thereof. Shank 50 preferably includes at least one stabilizing fin 55 (two shown as best seen in FIGS. 1 and 4).

As described in more detail below with reference to FIG. 10, shank 50 is used to removably anchor hook 10 into the live bait. Stabilizing fins 55 help temporarily hold the hook 10 in place on the bait and prevent the hook 10 from rotating while anchored in the bait.

As can be seen in FIGS. 1 and 4, stabilizing fins 55 differ from barbs 45. Fishing hook barbs are designed to easily pass through the skin of a fish, while at the same time to be hard to remove therefrom. This is because the barb has a sharp point curving or projecting in an opposite direction from the main point of the fish hook, thus forming a one-way catch point. However, fin 55 does not have such a catch point. Rather, fin 55 is a generally flat, triangular shape having a curved face 55a which tends to function as a cutting edge. Thus, after having been inserted into the bait, the fins 55 will easily tear or cut through the skin of the bait when the fisherman or woman jerks the rod to set the hook, having an opposite effect as a barb.

FIGS. 5A through 7A schematically illustrate a number of variations of hook 10, wherein each hook variation has a different number of hook portions 40. FIG. 5A is illustrated as having two hook portions 40. FIG. 6A is illustrated as having one hook portion 40. FIG. 7A is illustrated as having three hook portions 40. FIGS. 5B, 6B and 7B illustrate schematically a right side view of FIGS. 5A, 6A and 7A respectively. It should be understood that other variations, whether in the number, angle, size or position of the hook portions, are contemplated. Further, the hook 10 can be made of any material known in the art of fishing hooks.

FIG. 8 is a schematic view of the preferred rig 70 of the present invention. Rig 70, as illustrated, is comprised of a leader 80 attaching hook 10 at one end, and a fishing line 75 at another end. A slip bobber (not show) or other bobber can be attached to line 75 as is known in the art. Hook 10 is attached to leader 80 by a swivel 90 via a split ring 94. Line 75 is attached to leader 80 by a swivel 92. A loop 85 is formed around and through bead 100 in leader 80. Attached to the loop 85 by a swivel 104 and a snap fastener 106 is a jig 110.

The combination of loop 85 and bead 100 allows the rig 70 to be adjustable. As best seen in FIG. 9, the leader 80 is threaded through a bore 102 in bead 102. The leader 80 is then looped back around the bead 100, forming loop 85, and then passed through bore 102 again. By doing so, the bead 100 can be slide to a desired location along leader 80 by maintaining slack in the leader 80. In this manner, the distance between jig 110 and hook 10 can be adjusted as desired, according to the size of the bait. When the leader 80 is taut, as when in the rig 70 is in use, the bead 100 cannot be moved.

Referring now to FIG. 10, the rig 70 with hook 10 is shown positioned for use on a live bait 150 having a mouth 160 and a body 170. Bead 100 is adjusted as described above to a desired location providing the desired distance between jig 110 and hook 10. Bait 150 is then hooked to jig 110 at mouth 160. The jig hook should be positioned in such a manner that the bait 150 cannot pull free during use, but will break free when the hook is set. Shank 50 is then inserted under the skin of bait 150, preferably along the upper side of bait 150, for example approximate the dorsal fin of bait 150. It should be understood however that hook 10 could be positioned in any desired location along bait 150. Stabilizer fins 55 help temporarily hold shank 50 under the skin of bait 150, and prevents hook 10 from rotating about the axis of the shank 50 while in use.

When a game fish strikes bait 150, the fisherman or woman jerks the fishing rod to set the hook or hooks. When this occurs, a force is imparted to the rig 70, and jig 110 should break free from bait 150 which is clamped in the mouth of the game fish. Simultaneously, hook 10 will easily and quickly release from bait 150, with the intent of embedding into the mouth of the striking game fish. Stabilizer fins 55 allow for easy removable of the shank 50 from under the skin of the bait by tearing or cutting through the skin. Because the hook 10 is not hindered as are prior art rigs, the likelihood of hooking the game fish is increased.

It is to be understood that the embodiments herein described are merely illustrative of the principles of the present invention. Various modifications may be made by those skilled in the art without departing from the spirit or scope from the claims which follow.

What is claimed is:

1. A fish hook for live bait, comprising:
   a main portion extending in a plane and defining a longitudinal axis and a top side;
   at least one hook portion on said main portion extending from said main portion on said top side;
   a means for anchoring said fish hook to said bait, said means for anchoring extending substantially straight from said main body portion along said longitudinal axis completely in said plane of said main body portion and to the rear of said at least one hook portion, and
   said means for anchoring includes means for stabilizing said fish hook, said means for stabilizing comprising at least one generally flat, triangular fin-shaped panel extending perpendicular from said means for anchoring on said top side and to the rear of said at least one hook portion;
   wherein said generally flat, triangular fin-shaped panel being adapted to substantially prevent rotation of said means for anchoring and thus said main body portion and said hook portion about said longitudinal axis when anchored in said live bait.

2. The fish hook of claim 1, wherein said means for anchoring said fish hook being adapted to slice through said live bait via a cutting edge on said fin-shaped panel so as to be releasably securable to said live bait without affecting the livelihood of said live bait.

3. The fish hook of claim 1, wherein said means for anchoring is barbless.

4. A fish hook for attaching to the body of a live bait having skin, comprising:
- a main portion extending in a plane and defining a longitudinal axis and a top side;
- at least one hook portion on said main portion extending from said main portion on said top side;
- a releasable anchoring shank extending straight from said main portion along said longitudinal axis completely in said plane of said main body portion and to the rear of said at least one hook portion;
- at least one stabilizing fin-shaped panel extending from said anchoring shank on said top side and to the rear of said at least one hook portion, said at least one stabilizing fin-shaped panel adapted to prevent said shank and thus said main portion and said hook portion from rotating about said axis while in use when said anchoring shank and fin-shaped panel is completely inserted under the skin of said bait and in said body of said bait.

5. The fish hook of claim 4, wherein said fin-shaped panel includes a cutting edge such that said shank is adapted to completely insert under the skin of said live bait to releasably hold the fish hook thereto without affecting the livelihood of said live bait.

6. The fish hook of claim 5, wherein said shank is adapted to release from said bait upon receiving a force, without affecting the livelihood of said bait.

7. The fish hook of claim 4, wherein said at least one hook portion numbers one.

8. The fish hook of claim 4, wherein said at least one hook portion numbers two.

9. The fish hook of claim 4, wherein said at least one hook portion numbers three.

10. The fish hook of claim 4, wherein said at least one stabilizing fin-shaped panel numbers one.

11. The fish hook of claim 4, wherein said at least one stabilizing fin-shaped panel numbers two fin-shaped panels aligned along said shank.

12. The fish hook of claim 4, wherein said anchoring shank is barbless.

13. A method for releasably securing a hook having a main portion extending in a plane and defining a longitudinal axis and a top side, and at least one hook portion on said top side of said main portion, to live bait having a body with skin, comprising the steps of:
- providing said main portion of said hook with means for anchoring said hook to said body of said live bait, said means for anchoring extending straight from said main portion along said longitudinal axis completely in said plane of said main body portion and to the rear of said at least one hook portion;
- providing said means for anchoring, on said top side and to the rear of said at least one hook portion, with at least one stabilizing fin-shaped panel having a cutting edge, adapted to prevent rotation of said means for anchoring and thus said main portion and said hook portion about said axis when anchored in said live bait;
- inserting said means for anchoring said hook along a path of insertion completely under the skin and straight along a length of said live bait in said body of said live bait without affecting the livelihood of said bait, and
- selectively removing said means for anchoring said hook from said body of said live bait straight along the path of insertion of the hook without affecting the livelihood of said bait.

14. The method of claim 13, wherein said means for anchoring is a straight shank.

15. The method of claim 13, wherein said means for anchoring is barbless.

* * * * *